(12) United States Patent
Wang et al.

(10) Patent No.: US 8,023,578 B2
(45) Date of Patent: Sep. 20, 2011

(54) TWO-STAGE LOW-COMPLEXITY MAX-LOG BIT-LEVEL LLR CALCULATOR AND METHOD

(75) Inventors: Shuangquan Wang, Kearny, NJ (US); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 725 days.

(21) Appl. No.: 12/046,730

(22) Filed: Mar. 12, 2008

(65) Prior Publication Data

US 2009/0231028 A1  Sep. 17, 2009

(51) Int. Cl.
*H04L 5/12* (2006.01)
(52) U.S. Cl. ............ 375/261; 375/324; 329/304
(58) Field of Classification Search .......... 375/261, 375/324; 329/304
See application file for complete search history.

(56) References Cited

U.S. PATENT DOCUMENTS

| 6,594,318 | B1 * | 7/2003 | Sindhushayana | 375/262 |
| 2002/0151301 | A1 * | 10/2002 | Miyoshi | 455/423 |
| 2007/0086541 | A1 | 4/2007 | Moon et al. | |
| 2007/0260959 | A1 * | 11/2007 | Sidi et al. | 714/755 |
| 2008/0069185 | A1 * | 3/2008 | Elezabi | 375/144 |

FOREIGN PATENT DOCUMENTS

EP 1843534 10/2007

OTHER PUBLICATIONS

X. Gu et, al., "A novel efficient soft output demodulation algorithm for high order modulation," in Proc. 4th Int. Conf. Computer Inform. Technol., Wuhan, China, Sep. 2004, pp. 493-498 pages.

K. Fagervik et al.,"Low complexity bit by bit soft output demodulator," Electron. Lett., vol. 32, May 1999; pp. 985-987.

3rd Generation Partnership Project; Physical layer aspects of UTRA High Speed Downlink Packet Access, ETSI Std. 3GPP TS 25.848, Rev. 4.0.0, 2001; pp. 1-893.

* cited by examiner

*Primary Examiner* — Shuwang Liu
*Assistant Examiner* — Michael Neff
(74) *Attorney, Agent, or Firm* — James Bitetto; Joseph Kolodka

(57) ABSTRACT

A demodulator and demodulation method includes a bit/symbol hard demodulator configured to obtain hard bit or symbol information from a received signal. At least one lookup table is configured to reference coefficients for computation of log-likelihood ratios (LLRs) from the hard bit or symbol information. A log-likelihood ratio calculation module is configured to compute bit-level LLRs from the coefficients and the received signal.

16 Claims, 4 Drawing Sheets

$b_1b_2b_3$

|     |    | 011 ↔ -7 |   |
|---|---|---|---|
|     |    | 010 ↔ -5 |   |
|     | 01 | 110 ↔ -3 | ⊖ |
|  1  | 00 | 111 ↔ -1 |   |

| 0 | 10 | 101 ↔ +1 |   |
|---|----|----------|---|
|   | 11 | 100 ↔ +3 | ⊕ |
|   |    | 000 ↔ +5 |   |
|   |    | 001 ↔ +7 |   |

|     |    | 111 ↔ -7 |   |
|---|---|---|---|
|     |    | 110 ↔ -5 |   |
|     | 11 | 100 ↔ -3 | ⊖ |
|  1  | 10 | 101 ↔ -1 |   |

| 0 | 00 | 001 ↔ +1 |   |
|---|----|----------|---|
|   | 01 | 000 ↔ +3 | ⊕ |
|   |    | 010 ↔ +5 |   |
|   |    | 011 ↔ +7 |   |

FIG. 3

TWO-STAGE LOW-COMPLEXITY MAX-LOG BIT-LEVEL LLR CALCULATOR AND METHOD

BACKGROUND

1. Technical Field

The present invention relates to modulation and demodulation of information and more particularly to a two-stage low-complexity table-driven Max-Log bit-by-bit log-likelihood ratio (LLR) calculator and method.

2. Description of the Related Art

In many modern communication systems, where a soft decoder is employed, it is necessary to calculate a soft estimate for data bits from received signals. A maximum a posteriori (MAP) demodulator can be used to generate the bit-by-bit log-likelihood ratio (LLR), this is too complex for the practical implementation.

To avoid the ultra-high complexity of the MAP algorithm, Max-Log is practically used to compute the LLR, e.g., it is included in the 3GPP standard (Section A.1.4 of 3GPP TS 25.848). However, the complexity of Max-Log is high even for a constellation of moderate size, say, 64-QAM (Quadrature Amplitude Modulation) if no further simplification is considered.

For QAM constellations, based on the observation that a properly designed QAM constellation can be decomposed into two PAM (Pulse Amplitude Modulation) constellations, (see e.g., X. Gu, K. Niu, and W. Wu, "A novel efficient soft output demodulation algorithm for high order modulation," in *Proc. 4th Int. Conf. Computer Inform. Technol.*, Wuhan, China, September 2004, pp. 493-498 (hereinafter Gu et al.). This greatly reduces the complexity.

For PSK constellations, K. Fagervik and T. G. Jeans, in "flow complexity bit by bit soft output demodulator," *Electron. Lett.*, vol. 32, pp. 985-987, May 1999 (hereinafter Fagervik et al.), proposed an approximate Max-Log, which is less complex compared to the exact Max-Log with negligible performance loss. However, the complexity of the above state-of-the-art demodulators is still very high if high-order modulations are used, say, 1024-QAM and 32-PSK. The algorithms in Gu et al. and Fagervik et al. require many operations such as multiplications, additions, and comparisons to obtain results.

SUMMARY

A demodulator and demodulation method includes a bit/symbol hard demodulator configured to obtain hard bit or symbol information from a received signal. At least one lookup table is configured to reference coefficients for computation of log-likelihood ratios (LLRs) from the hard bit or symbol information. A log-likelihood ratio calculation module is configured to compute bit-level LLRs from the coefficients and the received signal.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2 is an irregular binary reflected Gray Code labeling method in accordance with one embodiment;

FIG. 3 is a regular binary reflected Gray Code labeling method in accordance with one embodiment;

DETAILED DESCRIPTION OF PREFERRED EMBODIMENTS

In accordance with the present principles, a novel modulator/demodulator system, device and method are provided. In one particularly useful embodiment, a two-stage low-complexity table-driven Max-Log bit-by-bit log-likelihood ratio (LLR) calculator is devised for both Quadrature Amplitude Modulation (QAM) and Pulse Amplitude Modulation (PSK) constellations by exploiting the Gray-code structure. A method in accordance with the present principles reduces the implementation complexity dramatically while offering improved performance.

The present embodiments provide much lower complexity compared to prior art demodulators. Specifically, present embodiments, based on lookup tables, only need one multiplication and at most three additions to compute the LLR per bit for any QAM modulation order, and about three multiplications and two additions for the practical PSK modulation order. For QAM constellations, the present embodiments can reduce the computational complexity up to, e.g., 81.25%, 83.33%, 91.67% and 95.83% in 16-, 64-, 256- and 1024-QAM, respectively, compared to the approximate Max-Log algorithm of Fagervik et al. while keeping the same performance.

For PSK constellations, the present embodiments can save the complexity up to 71.74%, 75.90% and 81.58% in 8-, 16- and 32-PSK, respectively, compared to the PSK demodulator of Gu et al. while providing better performance.

The present embodiments advantageously can be applied immediately in current and future communication systems.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Notations: we reserve $j=\sqrt{-1}$ for the imaginary unit, $\|\cdot\|$ for the amplitude of a complex number, $|\cdot|$ for the absolute value of a real number, $\hat{x}$ for the estimate of x, and k∈[M,N] denotes that k is an integer with M≦k≦N.

Figure 1:
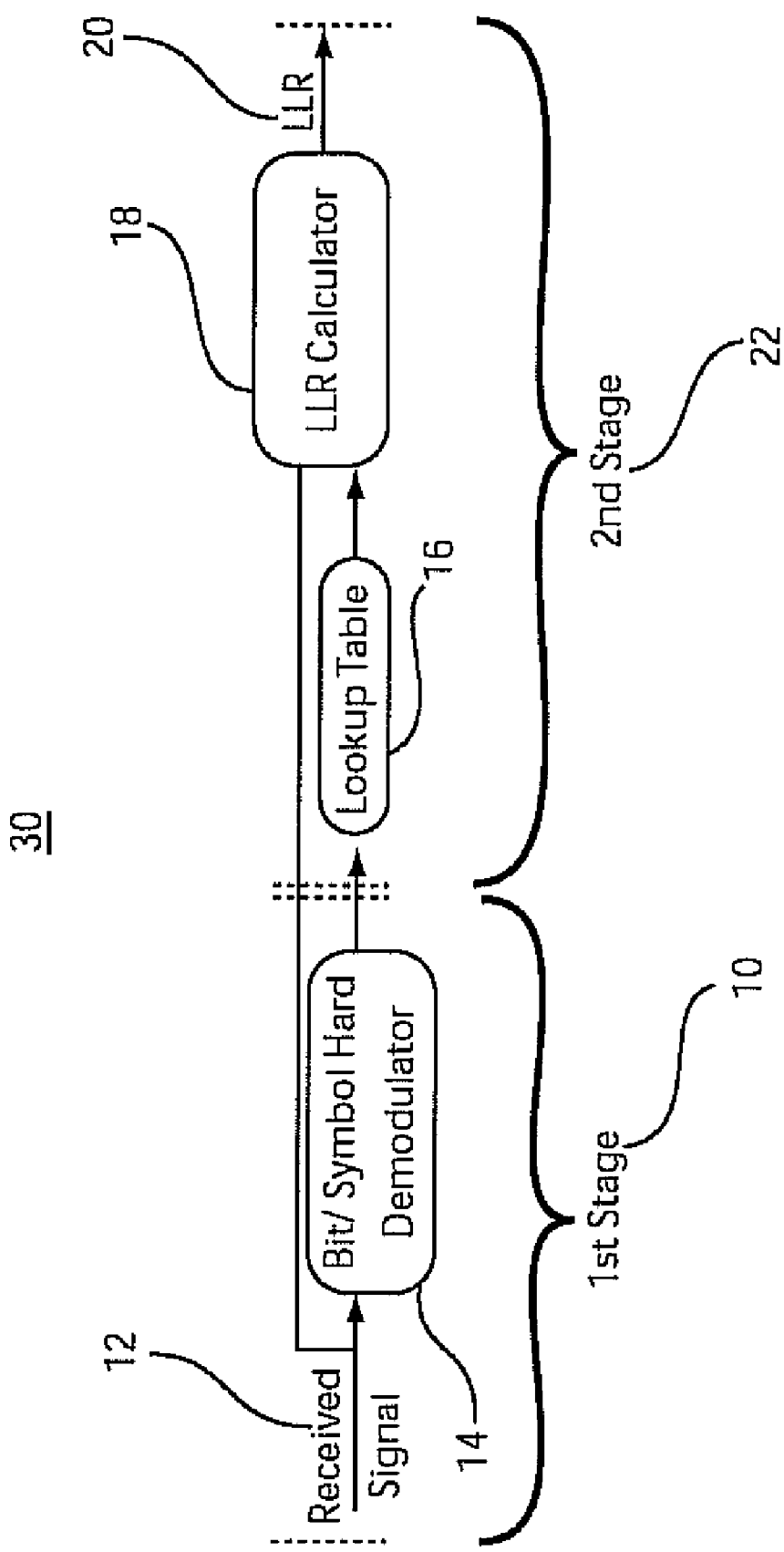
FIG. 1 is a block/flow diagram showing a two-stage low-complexity max-log bit-level LLR calculator and method in accordance with one illustrative embodiment.

Referring now to the drawings in which like numerals represent the same or similar elements and initially to FIG. 1, a block/flow diagram shows a system/method 30 in accordance with one embodiment. Two stages are shown (10 and 22). In a 1$^{st}$ stage 10, we obtain the bit- or symbol-level hard demodulation 14 from a received signal 12 in a very efficient way. In a 2$^{nd}$ stage 22, we retrieve coefficients from a lookup table 16, and compute LLRs 20 for all bits with an LLR calculator 18. More details will be given herein on the efficient method of demodulator 14 to obtain the bit- and symbol-level hard demodulation; the lookup table 16 for QAM and PSK constellation; and the computation 18 of the bit-level LLR 20 using the receive signal and the coefficients from the lookup table 16.

System Model: The system model in one embodiment may be given by $\tilde{z}=\tilde{x}+\tilde{e}$, where $\tilde{z}=z_I+jz_Q$, $\tilde{x}=x_I+jx_Q$, is the unnormalized transmitted symbol, $\tilde{e}=e_I+je_Q$ is the additive noise with power $E[\|\tilde{e}\|^2]=\gamma^{-1}$. The un-normalized $2^{2N}$-QAM constellation is given by $X=\{2i-1-2^N+j(2q-1-2), i,q\in[1,2^N]\}$.

Signal Constellation Construction and Modulation: $2^{2N}$-QAM Constellation Construction and Modulation: A $2^{2N}$-QAM constellation has two dimensions, called I- and Q-branches. To reduce the demodulation complexity, we label each branch independently by the binary reflected Gray code (BRGC), i.e., each branch of the QAM constellation is a BRGC-labeled PAM constellation. The BRGC is generated according to the following method. One example is shown in FIG. 2.

Referring to FIG. 2, an irregular BRGC labeling example for N=1, 2 and 3 is shown. BRGC for N bits can be generated recursively by inserting a binary 0 or 1 to the Gray code for N−1 bits, then inserting a binary 1 or 0 to the reflected (i.e., listed in reverse order) Gray code for N−1 bits at the same position. The base case for N=1 bit is $$\frac{0}{1} \text{ or } \frac{1}{0}.$$

For the incoming 2N bits, $c_1, c_2, \ldots c_{2N}$, we split them into two groups, $i_1, i_2, \ldots i_{2N}$, which is mapped to the in-phase (I) component of the QAM symbol, and $q_1, q_2, \ldots q_{2N}$, which is mapped to the quadrature component (Q). For example, for N=2, we can put the 1$^{st}$ and 4$^{th}$ bits into the first group as $i_1i_2=c_1c_4$, and the 2$^{nd}$ and 3$^{rd}$ bits into the second group as $q_1q_2=c_2c_3$. If the 4-PAM constellation of FIG. 2 (the 2$^{nd}$ column) is used, i.e., {01↔−3, 00↔−1, 10↔+1, 11↔+3}, and the incoming bits are 1010, the mapped QAM symbol will be 1−j3.

In the present embodiment, we only consider the PAM constellation labeled by the regular BRGC as an example. The regular BRGC is generated as follows. The regular BRGC for N bits can be generated recursively by inserting a binary 1 to the Gray code for N−1 bits, then inserting a binary 0 to the reflected (i.e., listed in reverse order) Gray code for N−1 bits at the same position. The base case for N=1 bit is $$\frac{1}{0}.$$

One example for N is equal to 1, 2 and 3 is shown in FIG. 3. All the QAM constellations in the existing standards such as, e.g., Worldwide Interoperability for Microwave Access (WiMAX) and High Speed Downlink Packet Access (HSDPA) and others (3GPP, 3GPP2, etc.) are included in the present method as special cases, i.e., all of them can be decomposed into two independent PAM constellations, and each of them is labeled by the above regular BRGC.

Referring to FIG. 3, a regular BRGC labeling example for N=1, 2 and 3 is illustratively shown.

$2^M$-PSK Constellation Construction and Modulation: In the present embodiments, we consider the PSK constellation labeled by the inverse regular BRGC as an example. The inverse regular BRGC is generated by inverting the binary bits in FIG. 3, more accurately. The inverse regular BRGC for N bits can be generated recursively by inserting a binary 0 to the Gray code for N−1 bits, then inserting a binary 1 to the reflected (i.e., listed in reverse order) Gray code for N−1 bits at the same position. The base case for N=1 bit is $$\frac{0}{1}.$$

Figure 4:
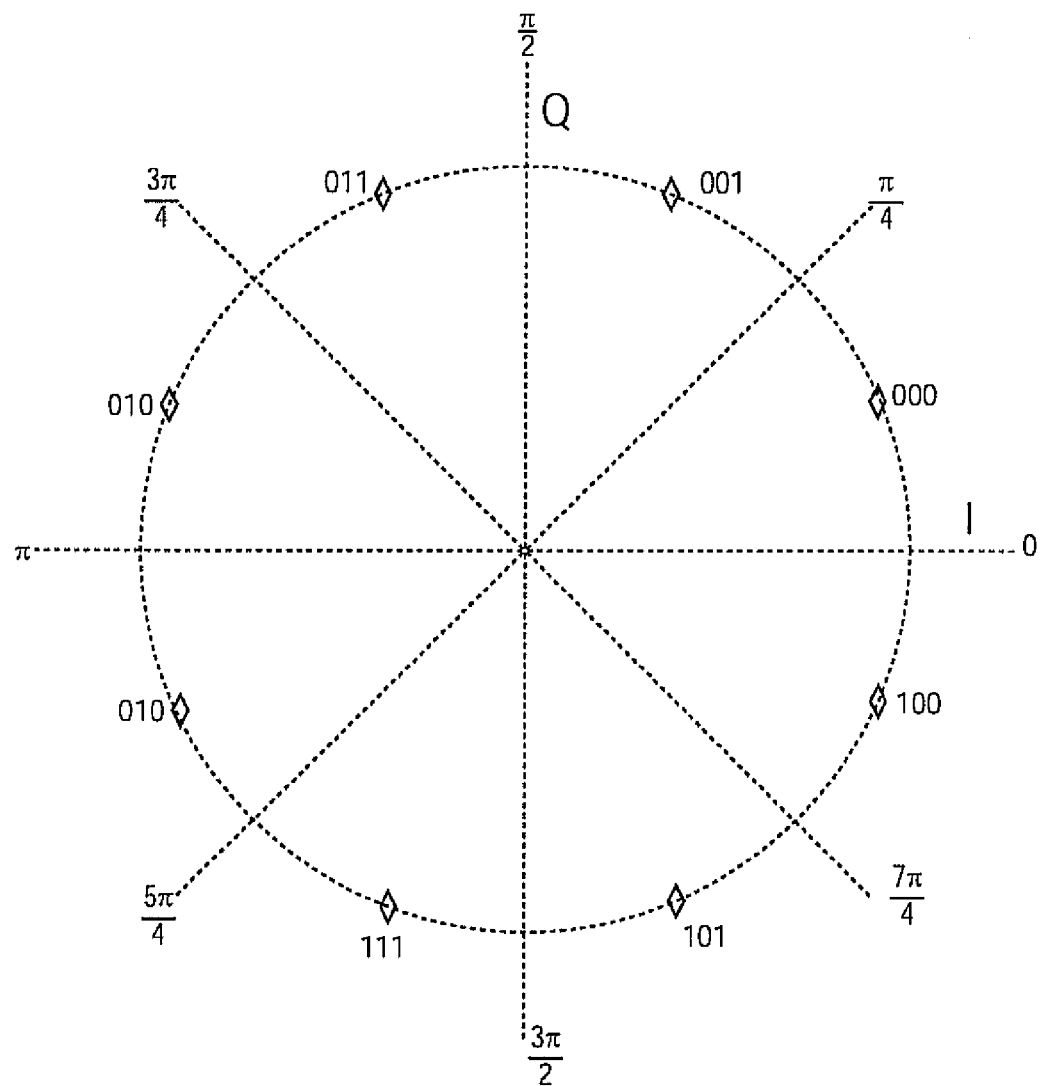
FIG. 4 is an illustrative unit circle employed in mapping hard bits to a PSK-8 constellation in accordance with one embodiment.

Referring to FIG. 4, a unit circle for the above-identified PSK constellation is illustratively shown. We assume all the $2^M$ points are located on a unit circle uniformly, and number the points counterclockwise starting from a first point of the first quadrature. Moreover, the phase of the first point is $2^{-M}\pi$. For example, the first point in the 8-PSK constellation is "000", with phase π/8, and the last point is "100" with phase 15π/8. It should be understood that similar circles may be employed for other modulations methods (e.g., 32-PSK, PAM, QAM, etc.).

Two-Stage LLR Calculation: $2^{2N}$-QAM Constellation

Hard Demodulation: As stated, the QAM constellation includes two separate PAM constellations. Each of these PAM constellations is labeled by the same BRGC label. Therefore, we can demodulate two branches one by one or in parallel with the same procedure. We use z to denote the real part or the imaginary part of the received signal $\tilde{z}$, and $b_n$ to denote the binary bit $i_n$ or $q_n$.

First, we calculate the decision metric by:

$$d_n = \begin{cases} z, & n = 1 \\ 2^{N+1-n} - |d_{n-1}|, & n \in [2, N]. \end{cases}$$

Then we obtain bit-level hard decisions by:

$$\hat{b}_n = \begin{cases} 0, & d_n \geq 0 \\ 1, & d_n < 0, \end{cases} \quad n \in [1, N].$$

Another efficient method for symbol-level hard decisions:

$$\hat{x} = \begin{cases} \text{sign}(z)(2^N - 1), & |z| \geq 2^N - 1 \\ \text{sign}(z)[FL(|z|) + LSB(FL(|z|))], & |z| \geq 2^N - 1, \end{cases}$$

where FL(y) rounds the real number y to the nearest integer towards minus infinity, LSB(k) is the least significant bit (LSB) of the integer k, and sign(z) gives 1 if z is greater than 0, and −1 if z is less than 0.

Lookup Tables: The lookup tables for the regular BRGC-labeled 4-, 8-, 16- and 32-PAM are given by Tables 1-4, respectively.

TABLE 1

The lookup table for 4-PAM constellation

| | |$\hat{x}$| ($\hat{b}_2$) | | | |
|---|---|---|---|---|
| | 1 (0) | | 3 (1) | |
| n | α | β | α | β |
| 1 | 1 | 0 | 2 | 2 |
| 2 | 1 | 2 | 1 | 2 |

TABLE 2

The lookup table for 8-PAM constellation

| | |$\hat{x}$| ($\hat{b}_2\hat{b}_3$) | | | | | | |
|---|---|---|---|---|---|---|---|---|
| | 1 (01) | | 3 (00) | | 5 (10) | | 7 (11) | |
| n | α | β | α | β | α | β | α | β |
| 1 | 1 | 0 | 2 | 2 | 3 | 6 | 4 | 12 |
| 2 | 2 | 6 | 1 | 4 | 1 | 4 | 2 | 10 |
| 3 | −1 | −2 | −1 | −2 | 1 | 6 | 1 | 6 |

TABLE 3

The lookup table for 16-PAM Constellation

| | |$\hat{x}$| ($\hat{b}_2\hat{b}_3\hat{b}_1$) | | | | | | | | | | | | |
|---|---|---|---|---|---|---|---|---|---|---|---|---|---|---|
| | 1 (011) | | 3 (010) | | 5 (000) | | 7 (001) | | 9 (101) | | 11 (100) | | 13 (110) | | 15 (111) | |
| n | α | β | α | β | α | β | α | β | α | β | α | β | α | β | α | β |
| 1 | 1 | 0 | 2 | 2 | 3 | 6 | 4 | 12 | 5 | 20 | 6 | 30 | 7 | 42 | 8 | 56 |
| 2 | 4 | 20 | 3 | 18 | 2 | 14 | 1 | 8 | 1 | 8 | 2 | 18 | 3 | 30 | 4 | 44 |
| 3 | −2 | −6 | −1 | −4 | −1 | −4 | −2 | −10 | 2 | 22 | 1 | 12 | 1 | 12 | 2 | 26 |
| 4 | −1 | −2 | −1 | −2 | 1 | 6 | 1 | 6 | −1 | −10 | −1 | −10 | 1 | 14 | 1 | 14 |

TABLE 4

The lookup table for 32-PAM constellation

| | |$\hat{x}$| ($\hat{b}_2\hat{b}_3\hat{b}_4\hat{b}_5$) | | | | | | | | | | | | |
|---|---|---|---|---|---|---|---|---|---|---|---|---|---|---|
| | 1 (0111) | | 3 (0100) | | 5 (0100) | | 7 (0101) | | 9 (0001) | | 11 (0000) | | 13 (0010) | | 15 (0011) | |
| n | α | β | α | β | α | β | α | β | α | β | α | β | α | β | α | β |
| 1 | 1 | 0 | 2 | 2 | 3 | 6 | 4 | 12 | 5 | 20 | 6 | 30 | 7 | 42 | 8 | 56 |
| 2 | 8 | 72 | 7 | 70 | 6 | 66 | 5 | 60 | 4 | 52 | 3 | 42 | 2 | 30 | 1 | 16 |
| 3 | −4 | −20 | −3 | −18 | −2 | −14 | −1 | −8 | −1 | −8 | −2 | −18 | −3 | −30 | −4 | −44 |
| 4 | −2 | −6 | −1 | −4 | −1 | −4 | −2 | −10 | 2 | 22 | 1 | 12 | 1 | 12 | 2 | 26 |
| 5 | −1 | −2 | −1 | −2 | 1 | 6 | 1 | 6 | −1 | −10 | −1 | −10 | 1 | 14 | 1 | 14 |

| | |$\hat{x}$| ($\hat{b}_2\hat{b}_3\hat{b}_4\hat{b}_5$) | | | | | | | | | | | | |
|---|---|---|---|---|---|---|---|---|---|---|---|---|---|---|
| | 17 (1011) | | 19 (1010) | | 21 (1000) | | 23 (1001) | | 25 (1101) | | 27 (1100) | | 29 (1110) | | 31 (1111) | |
| n | α | β | α | β | α | β | α | β | α | β | α | β | α | β | α | β |
| 1 | 9 | 72 | 10 | 90 | 11 | 110 | 12 | 132 | 13 | 156 | 14 | 182 | 15 | 210 | 16 | 240 |
| 2 | 1 | 16 | 2 | 34 | 3 | 54 | 4 | 76 | 5 | 100 | 6 | 126 | 7 | 154 | 8 | 184 |
| 3 | 4 | 84 | 3 | 66 | 2 | 46 | 1 | 24 | 1 | 24 | 2 | 50 | 3 | 78 | 4 | 108 |
| 4 | −2 | −38 | −1 | −20 | −1 | −20 | −2 | −42 | 2 | 54 | 1 | 28 | 1 | 28 | 2 | 58 |
| 5 | −1 | −18 | −1 | −18 | 1 | 22 | 1 | 22 | −1 | −26 | −1 | −26 | 1 | 30 | 1 | 30 |

Reading α and β from Tables 1-4: We can have α and β from Tables 1-4 by the following rule, where the entry to the table is the bit position n and the last N−1 hard demodulated bits $b_2 \ldots b_N$:

Rule 1: (Reading α and β from a Lookup Table).

1. If $\hat{b}_1=1$, α and β are used as is.
2. If $\hat{b}_1=0$, when calculating LLR ($\lambda_1$), α is used as is, and β alternates its sign, i.e., if the value in the table is p then β is −p. When calculating $\lambda_n$, n≧2, α alternates its sign and β is used as is.

Calculate bit-level LLR: Once we have α and β, we compute the LLR according to the following equation for each bit.

$$\lambda = 4\gamma(\alpha z + \beta)$$

$2^M$-PSK Constellation: Hard Demodulation:

As stated above, the incoming M bits, $c_1, c_2, \ldots c_M$ are mapped to a $2^M$-PSK symbol. If the inverse regular BRGC labeling is used, the hard bits for 8-PSK are given by:

$$\hat{c}_1 = \begin{cases} 0, & z_Q \geq 0, \\ 1, & z_Q < 0. \end{cases}$$

-continued $$\hat{c}_2 = \begin{cases} 0, & z_I \geq 0, \\ 1, & z_I < 0. \end{cases}$$

$$\hat{c}_3 = \begin{cases} 0, & |z_I| \geq |z_Q|, \\ 1, & |z_I| < |z_Q|. \end{cases}$$

For 16-PSK, the $1^{st}$ three hard bits are decided according to the above three equations, i.e., the decision rule for 8-PSK, and the $4^{th}$ hard bit is given by:

$$\hat{c}_4 = \begin{cases} 1, & \tan\frac{\pi}{8} < \frac{|z_Q|}{|z_I|} < \tan\frac{3\pi}{8}, \\ 0, & \text{otherwise.} \end{cases}$$

For 32-PSK, the $1^{st}$ four hard bits are decided according to the above four equations, i.e., the decision rule for 16-PSK, and the $5^{th}$ hard bit is given by:

$$\hat{c}_5 = \begin{cases} 1, & \tan\frac{\pi}{16} < \frac{|z_Q|}{|z_I|} < \tan\frac{3\pi}{16} \text{ or } \tan\frac{5\pi}{16} < \frac{|z_Q|}{|z_I|} < \tan\frac{7\pi}{16}, \\ 0, & \text{otherwise.} \end{cases}$$

Lookup Tables: The lookup tables for the inverse regular BRGC-labeled 8-, 16- and 32-PSK are given by Tables 5-7, respectively.

TABLE 5

The lookup table for 8-PSK constellation

| | $a_1 a_2$ | | | | $a_3$ | |
|---|---|---|---|---|---|---|
| k | 00 | 01 | 11 | 10 | 0 | 1 |
| 1 | −1 | 1 | −1 | 1 | 0 | .2706 |
| 2 | | 1 | | | .6533 | .3827 |
| 3 | 1 | | −1 | 1 | | .2706 |

TABLE 6

The lookup table for 16-PSK constellation

| | $a_1 a_2$ | | | | $a_3 a_4$ | | | |
|---|---|---|---|---|---|---|---|---|
| k | 00 | 01 | 11 | 10 | 00 | 01 | 11 | 10 |
| 1 | −1 | 1 | −1 | 1 | 0 | .0747 | .2126 | .3928 |
| 2 | | 1 | | | .5879 | .5133 | .3753 | .1951 |
| 3 | 1 | | −1 | 1 | .2126 | | .1379 | .3182 |
| 4 | | | | | | .0747 | | −.1802 |

TABLE 7

The lookup table for 32-PSK constellation

| | $a_1 a_2$ | | | | $a_3 a_4 a_5$ | | | | | | | |
|---|---|---|---|---|---|---|---|---|---|---|---|---|
| k | 00 | 01 | 11 | 10 | 000 | 001 | 011 | 010 | 110 | 111 | 101 | 100 |
| 1 | −1 | 1 | −1 | 1 | 0 | .0191 | .0566 | .1111 | .1804 | .2619 | .3525 | .4486 |
| 2 | | 1 | | | .5466 | .5275 | .4900 | .4355 | .3622 | .2847 | .1942 | .0980 |
| 3 | 1 | | −1 | 1 | .1804 | .1613 | .1238 | .0693 | | .1508 | .2414 | .3375 |
| 4 | | | | | .0566 | .0375 | .0920 | −.1721 | | −.0906 | | −.1867 |
| 5 | | | | | | .0191 | | −.0545 | .0815 | | −.0961 | |

Reading $K_I$ and $K_Q$ from Tables 5-7: We can have $K_I$ and $K_Q$ from Tables 5-7 by the following rule, where the entry to the table is the bit position k and the hard demodulated bits. In Tables 5-7, k is the entry for bit position, $a_1$, $a_2$ is the entry for the quadrature sign S, and a3 ... am is the entry for the value K. $K_I$ and $K_Q$ are calculated by the product of the quadrature sign S and the value K. For a given hard-modulated symbol, $\hat{c}_1 \hat{c}_2 \ldots \hat{c}_m$ (M is equal to 3, 4 and 5 for 8-PSK, 16-PSK and 32-PSK, respectively), we have the following rule to decide $K_I$ and $K_Q$.

1. For $K_I$, S is read out according to the entry k=m and $a_1 a_2 = \hat{c}_1 \hat{c}_2$, and K is read out according to k=m and $a_3 \ldots a_m = \hat{c}_3 \ldots \hat{c}_m$.

2. For $K_Q$, S is read out according to the entry k=

$$\begin{cases} 1, & m = 2 \\ 2, & m = 1 \\ m, & m \geq 3 \end{cases} \text{ and } a_1 a_2 = \begin{cases} \hat{c}_1 \hat{c}_2 & \hat{c}_1 \neq \hat{c}_2 \\ \overline{\hat{c}_1} \overline{\hat{c}_2} & \text{otherwise} \end{cases}$$

where $\overline{\circ}$ denotes the binary inverse. In addition, S will alternate its sign if $k \geq 4$. K is read out according to k and $a_3 \ldots a_m$, $\overline{\hat{c}}_3 \ldots \overline{\hat{c}}_M$.

Calculate bit-level LLR: Once we have $K_I$ and $K_Q$ we compute the LLR according to the following equation for each bit.

$$\lambda = 4\gamma(K_I z_I + K_Q z_Q)$$

Although the above hard demodulation and lookup tables are derived for regular BRGC-labeled QAM and inverse regular BRGC-labeled PSK constellations, we want to emphasize the above idea can be easily applied to other BRGC-labeled QAM and PSK constellations. This is because the lookup table will be fixed when the constellation is given.

Figure 5:
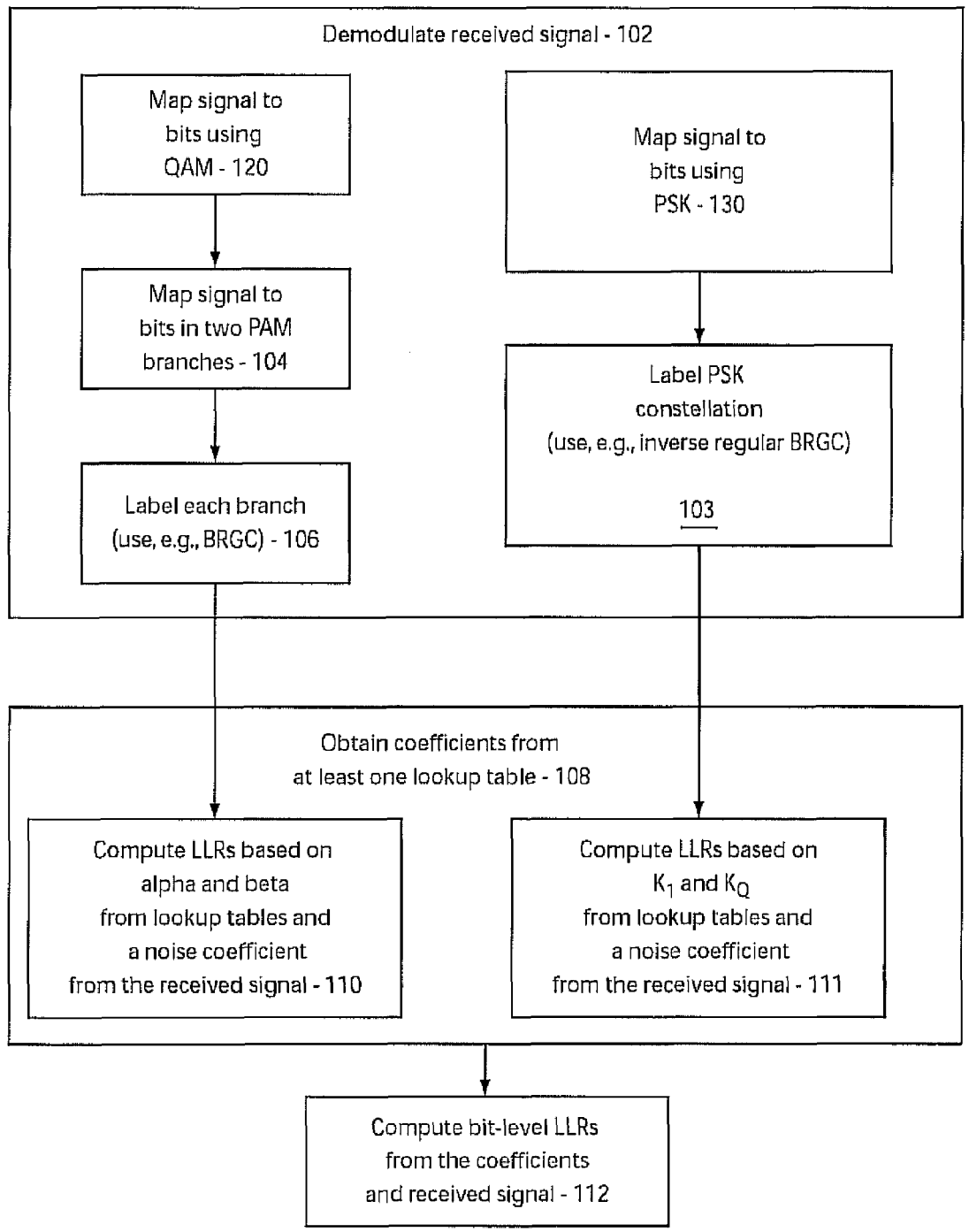
FIG. 5 is a block/flow diagram showing a system/method for a demodulator for performing bit-level LLR in accordance with the present principles.

Referring to FIG. 5, a block/flow diagram showing a system/method for demodulation is illustratively depicted in accordance with the present principles. In block 102, a received signal is demodulated to obtain hard bit or hard symbol information. The demodulating includes mapping the incoming information to hard bits in accordance with a $2^{2N}$ quadrature amplitude modulation (QAM) constellation (path 120) or in accordance with a $2^M$ pulse shift keying modulation (PSK) constellation (path 130).

Along path 120, in block 104, the QAM constellation includes two branches, and the two branches each employ a pulse amplitude modulation (PAM) constellation for mapping the hard bits. In block 106, each branch is labeled with the same labeling method and preferably in accordance with a regular binary reflected Gray code (BRGC). Along path 130, in block 103, the PSK constellation is labeled preferably in accordance with an inverse regular binary reflected Gray code (BRGC).

In block 108, coefficients from at least one lookup table are referenced and obtained to compute log-likelihood ratios (LLRs) from the hard bit or symbol information.

In path 120, in block 110, computing bit-level log-likelihood ratios includes computing the LLRs based upon coefficients α and β obtained from the at least one lookup table and an additive noise coefficient computed from the received signal, wherein the coefficients α and β are indexed by bit/symbol estimates and bit position.

In path 130, in block 111, computing bit-level log-likelihood ratios includes computing the LLRs based upon coefficients $K_I$ and $K_Q$ obtained from the at least one lookup table and an additive noise coefficient computed from the received signal, wherein the coefficients $K_I$ and $K_Q$ are indexed by hard modulated bits and bit position. The hard modulated bits provide a quadrature sign (S) and a value K which are employed to lookup $K_I$ and $K_Q$.

In block 112, bit-level log-likelihood ratios LLRs are computed from the coefficients and the received signal. LLRs are employed in bit predictions and are employed as is known in the art.

Having described preferred embodiments for a two-stage low-complexity max-log bit-level LLR calculator and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A demodulator comprising:
   a bit/symbol hard demodulator configured to obtain hard bit or symbol information from a received signal;
   at least one lookup table configured to reference coefficients for computation of log-likelihood ratios (LLRs) from the hard bit or symbol information; and
   a log-likelihood ratio calculation module configured to compute bit-level LLRs from the referenced-coefficients and the received signal; said log-likelihood ratio calculation module computing the LLR based upon coefficients obtained from the at least one lookup table and an additive noise coefficient computed from the received signal, said received signal including in-phase and quadrature components and the hard demodulators further comprising a $2^{2N}$ quadrature amplitude modulation (QAM) constellation for mapping the incoming information to hard bits with N being number of bits.

2. The demodulator as recited in claim 1, wherein the QAM constellation includes two branches, and the two branches each include a pulse amplitude modulation (PAM) constellation.

3. The demodulator as recited in claim 2, wherein each branch is labeled in accordance with a binary reflected Gray code (BRGC).

4. The demodulator as recited in claim 1, wherein the coefficients are indexed by bit and symbol estimates and bit position.

5. The demodulator as recited in claim 1, wherein the received signal includes in-phase and quadrature components and the hard demodulator further comprising a $2^M$ pulse shift keying modulation (PSK) constellation with M being incoming bits for mapping the incoming information to hard bits.

6. The demodulator as recited in claim 5, wherein PSK constellation is labeled in accordance with an inverse regular binary reflected Gray code (BRGC).

7. The demodulator as recited in claim 5, wherein log-likelihood ratio calculation module computes the LLR based upon coefficients obtained from the at least one lookup table and an additive noise coefficient computed from the received signal.

8. The demodulator as recited in claim 7, wherein the coefficients are indexed by hard modulated bits and bit position.

9. The demodulator as recited in claim 8, wherein the hard modulated bits provide a quadrature sign (S) and a value which are employed to lookup at least one coefficient.

10. A method for demodulation, comprising:
    demodulating a received signal to obtain hard bit or symbol information and mapping the incoming information to hard bits in accordance with a $2^{2N}$ quadrature amplitude modulation (QAM) constellation with N being number of bits;
    referencing coefficients from at least one lookup table to compute log-likelihood ratios (LLRs) from the hard bit or symbol information;
    computing bit-level log-likelihood ratios LLRs from the referenced coefficients and the received signal and computing bit-level log-likelihood ratios includes computing the LLRs based upon coefficients obtained from the at least one lookup table and an additive noise coefficient computed from the received signal, wherein the coefficients are indexed by bit/symbol estimates and bit position.

11. The method as recited in claim 10, wherein the QAM constellation includes two branches, and the two branches each employ a pulse amplitude modulation (PAM) constellation for mapping the hard bits.

12. The method as recited in claim 11, further comprising labeling each branch in accordance with a binary reflected Gray code (BRGC).

13. The method as recited in claim 10, wherein demodulating includes mapping the incoming information to hard bits in accordance with a $2^M$ pulse shift keying modulation (PSK) constellation with M being incoming bits.

14. The method as recited in claim 13, further comprising labeling the PSK constellation in accordance with an inverse regular binary reflected Gray code (BRGC).

15. The method as recited in claim 13, wherein computing bit-level log-likelihood ratios includes computing the LLRs based upon coefficients obtained from the at least one lookup table and an additive noise coefficient computed from the received signal, wherein the coefficients are indexed by hard modulated bits and bit position.

16. The method as recited in claim 15, wherein the hard modulated bits provide a quadrature sign (S) and a value which are employed to lookup at least one coefficient.

* * * * *